G. SPRAGUE.
Land-Marker.
No. 65,443.  Patented June 4, 1867.
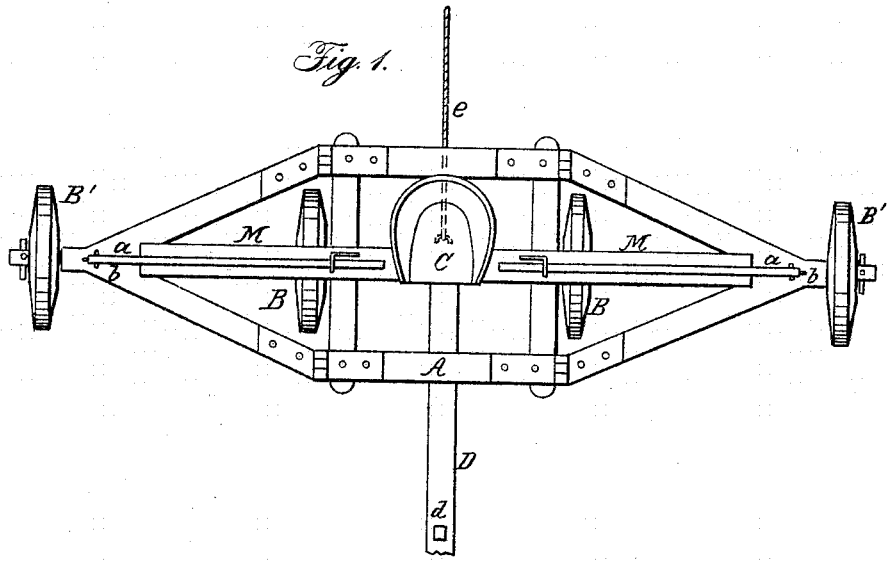
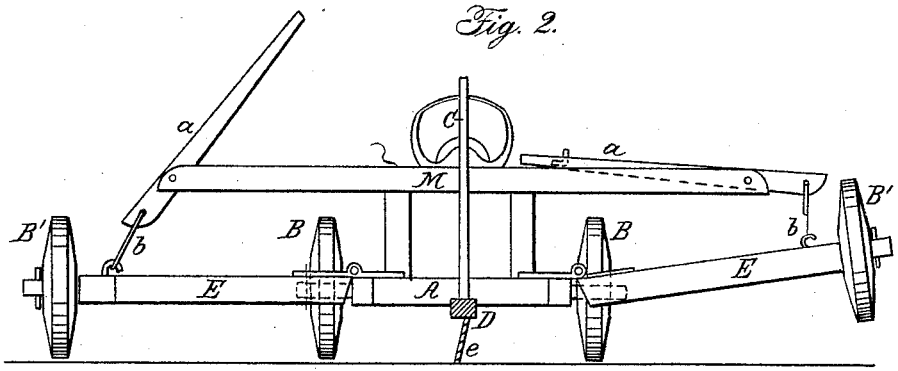
Witnesses:
Thos. Tusche
Wm. Trewin
Inventor:
Geo. Sprague
Per J. Munn & Co.
Attorneys.

United States Patent Office.

GEORGE SPRAGUE, OF SPRING HILL, KANSAS.

Letters Patent No. 65,443, dated June 4, 1867.

MACHINE FOR MARKING CORN GROUND.

The Schedule referred to in these Letters Patent and making part of the same.

TO ALL WHOM IT MAY CONCERN:

Be it known that I, GEORGE SPRAGUE, of Spring Hill, in the county of Johnson, and State of Kansas, have invented a new and useful improvement in Machine for Marking Corn Ground; and I do hereby declare that the following is a full, clear, and exact description thereof, which will enable others skilled in the art to make and use the same, reference being had to the accompanying drawings, forming part of this specification, in which—

Figure 1 is a top view of my improved corn-ground marker.
Figure 2 is a front view.
Similar letters of reference indicate like parts.

This invention relates to an improved plan of constructing a machine for marking the rows in a field for planting corn, and consists in a truck-frame mounted on two wheels, and wing frames on each side hinged to the central track-frame and carrying wheels at each end, which outside wheels are raised or lowered at the pleasure of the driver, in his seat in the middle of the machine, to regulate the marking of the rows. The wheels are placed at proper distances apart for marking the rows of corn, which they do by travelling over the field in straight lines from side to side, directed by guide-stakes set up for the purpose as hereinafter described.

A represents a rectangular truck-frame, set on low wheels B B, made solid of wood, or with spokes, as desired. C is a driver's seat mounted on a cross-frame, M, and D the draught-pole. Wings E E are hinged to the sides of the truck-frame A so that they can rise or fall with the wheels B' B' on the outer ends, as shown in fig. 2. The wheels are all placed as far apart as the width desired for the corn rows. The cross-frame M extends out on both sides nearly to the outer ends of the wings E E, and levers $a$ $a$ are pivoted to the ends of the frame M and connected by hooks $b$ $b$ or otherwise to the wings E E, so that the driver on his seat can raise or lower the wings and outside wheels, either side, at pleasure. An upright rod, $d$, is fixed on the tongue, and a measuring line, $e$, is attached to the frame under the driver's seat. The machine is driven across the field to be marked guided by stakes set up at proper distances apart, the upright rod $d$ on the tongue being kept in range with the stakes by the driver, and as the stakes are moved and placed from time to time at distances from each other measured by the line $e$ $e$, which is always at hand. The outside wheels are raised on both sides in turning the machine, and on one side in completing a field when three rows only are required to finish it out.

Having described my invention, I claim as new, and desire to secure by Letters Patent—

1. The hinged side wings E E, with wheels B' B' on their outer ends, combined with the truck-frame A with wheels B B, and levers $a$ $a$, arranged and operating substantially as and for the purposes described.

2. The guide-rod $d$ on the tongue D, and the measuring line $e$ in combination with the truck-frame A, employed as herein described.

GEORGE SPRAGUE.

Witnesses:
J. R. GRISTY,
E. S. JOHNSON.